United States Patent
Kats et al.

(10) Patent No.: US 11,879,783 B2
(45) Date of Patent: Jan. 23, 2024

(54) PLANCK SPECTROMETER

(71) Applicant: Wisconsin Alumni Research Foundation, Madison, WI (US)

(72) Inventors: Mikhail A. Kats, Madison, WI (US); Yuzhe Xiao, Madison, WI (US); Chenghao Wan, Madison, WI (US); Jad Salman, Madison, WI (US)

(*) Notice: Subject to any disclaimer, the term of this patent is extended or adjusted under 35 U.S.C. 154(b) by 429 days.

(21) Appl. No.: 17/117,954

(22) Filed: Dec. 10, 2020

(65) Prior Publication Data
US 2022/0187134 A1   Jun. 16, 2022

(51) Int. Cl.
G01J 5/08       (2022.01)
G01J 5/0806   (2022.01)
G01J 5/53       (2022.01)
G01J 5/48       (2022.01)

(52) U.S. Cl.
CPC ........... *G01J 5/0887* (2013.01); *G01J 5/0806* (2013.01); *G01J 5/53* (2022.01); *G01J 5/485* (2022.01)

(58) Field of Classification Search
CPC .......... G01J 5/0887; G01J 5/0806; G01J 5/53; G01J 5/485; G01J 5/0801; G01J 5/601; G01J 2005/0077; G01J 5/532; G01J 5/802
See application file for complete search history.

(56) References Cited

U.S. PATENT DOCUMENTS

| | | |
|---|---|---|
| 2005/0248758 A1 | 11/2005 | Carron et al. |
| 2010/0246631 A1 | 9/2010 | Barlett et al. |
| 2015/0168132 A1* | 6/2015 | Barak ............. G01N 21/95692 356/369 |
| 2015/0211922 A1 | 7/2015 | Yu |
| 2019/0204151 A1 | 7/2019 | Lin et al. |

FOREIGN PATENT DOCUMENTS

JP    2012208050 A    10/2012

OTHER PUBLICATIONS

International Search Report for PCT/US2021/072628 dated Sep. 27, 2022.

* cited by examiner

*Primary Examiner* — Lisa M Caputo
*Assistant Examiner* — Janice M Soto
(74) *Attorney, Agent, or Firm* — Boyle Fredrickson, SC

(57) ABSTRACT

An optical spectrometer uses broadband radiation detectors to measure thermal radiation generated by the varied heating of an object without complex mechanical mechanisms, narrowband filters, or the like. The received thermal radiation is used to deduce spectral qualities of either the thermal radiation emitter or a second object reflecting or transmitting this thermal radiation.

16 Claims, 2 Drawing Sheets

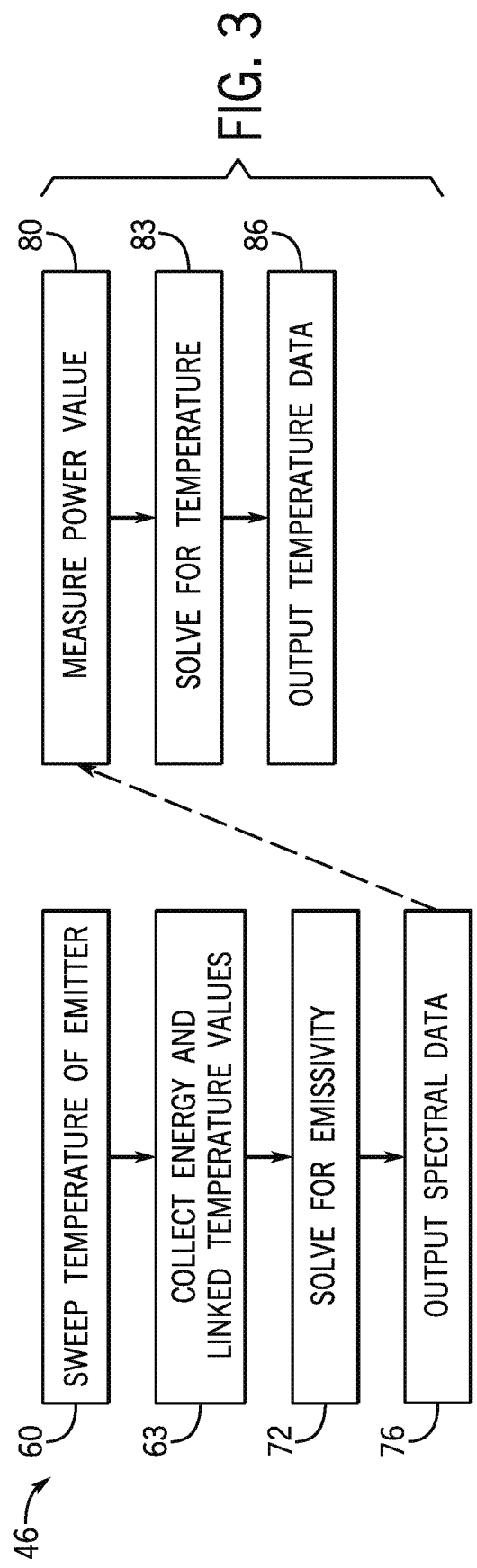
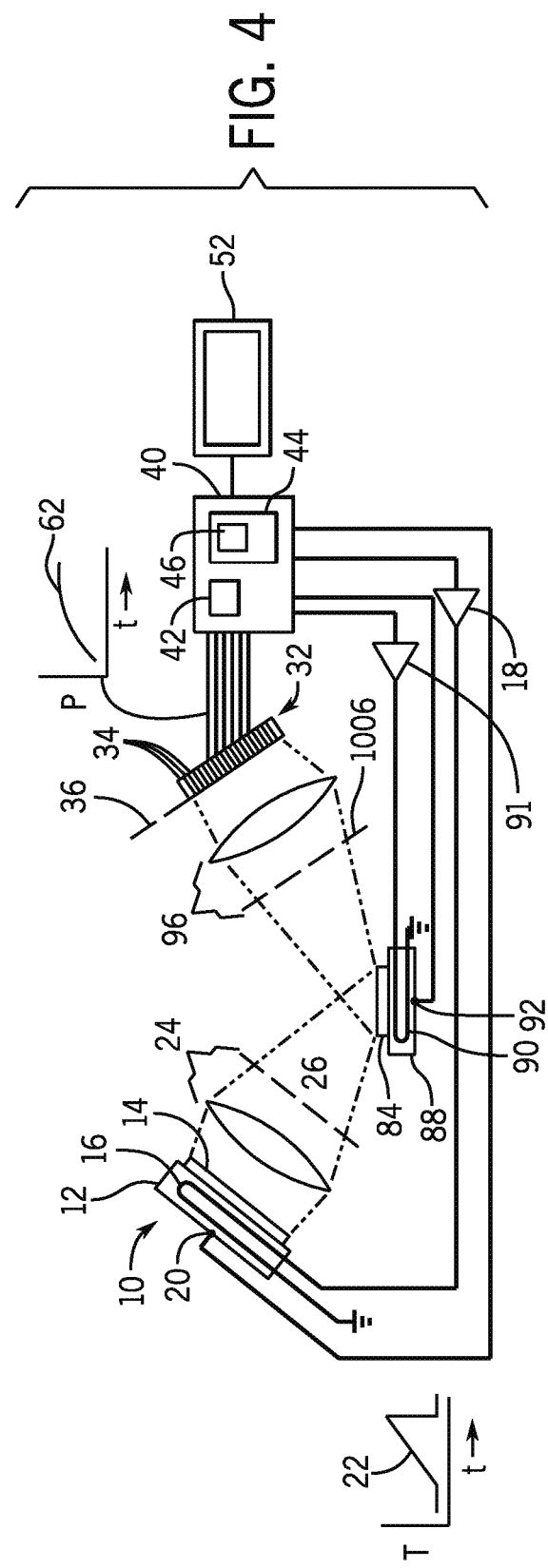

PLANCK SPECTROMETER

This invention was made with government support under 1750341 awarded by the National Science Foundation and under N00014-20-1-2297 awarded by the NAVY/ONR. The government has certain rights in the invention.

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates to optical spectrometers and in particular to an optical spectrometer that may derive spectral characteristics of an object or material using generated thermal radiation emitted at a variety of temperatures.

Optical spectrometers can be used to measure light frequency (a spectrum) emitted from, reflected from, or transmitted through an object or material being studied thereby revealing information about the object properties. In one simple spectrometer design, different frequency components of the light from the object being studied are spatially dispersed by a prism, grating, or the like. Broadband detectors are then spatially arrayed in the dispersion to separately measure each frequency component of a spectrum.

A different spectrometer design may make use of frequency-discriminating detectors each sensitive to a different spectral component. These frequency discriminating detectors, for example, may be produced by associating broadband detectors with different, narrow-band spectral filters or with a filter wheel or the like that moves in front of a group of detectors.

"Interference" type spectrometers, such as Fourier transform spectrometers, distinguish among different frequency components of light by noting constructive and destructive interference of these components at different phase offsets.

When measurements of light transmission or reflection are desired, the object or material being studied may be illuminated sequentially with different narrow-bandwidth light frequencies. One or more broadband detectors, whose output is sampled synchronously with the known changing light frequency, can then be used to assemble a spectrum measurement.

SUMMARY OF THE INVENTION

The present invention provides a spectrometer that eliminates significant drawbacks to prior art spectrometer designs including the need for narrowband filters, narrowband light sources, dispersive elements, and/or precise mechanical positioning of optical elements. In one embodiment, the present invention works with one or more broadband detectors detecting light emitted from an object as the temperature of that object is changed. The measurement of the time varying (and temperature varying) "blackbody" radiation from the object can then be processed to reveal the underlying spectral characteristics of the object being studied. Alternatively, thermal radiation from a known reference emitter may be used to illuminate a separate sample to similar effect.

Specifically, in one embodiment, the invention provides an optical spectrometer having a temperature adjustable stage adapted to control the temperature of an emission source, the latter providing thermal radiation in response to multiple temperatures of the temperature adjustable stage, and at least one broadband light detector receiving the thermal radiation from the emission source as so positioned to provide thermal-radiation power measurements. An electronic computer executes a program stored in non-transitory media to: (a) sample the thermal-radiation power measurements and temperatures of the temperature adjustable stage at a set of sampling times and different emission source temperatures to provide a power curve as a function of temperature; and (b) process the power curve to characterize the emissivity of a sample object over a range of wavelengths.

It is thus a feature of at least one embodiment of the invention to provide an extremely simple and robust spectrometer that develops spectral information by "sweeping" through light frequencies by changing a temperature of an emitter.

The processing of the power curve may scale the power curve according to a reference power curve of an object of known emissivity.

It is thus a feature of at least one embodiment of the invention to provide spectral information by calibration and reference to a known object.

The reference object of known emissivity may have a substantially constant emissivity in a predetermined frequency range of interest.

It is thus a feature of at least one embodiment of the invention to provide a spectrum reference to a constant emissivity for ease of reference.

The sample object may be the emission source and the processing of the power curve may further provide a spectrum of the emissivity of the emission source.

It is thus a feature of at least one embodiment of the invention to provide a simple method of characterizing an object emissivity by sampling broadband radiation at different temperatures without the need for filters or the like.

The processing of the power curve may provide an output satisfying a solution to the equation of:

$$[\varepsilon(\lambda_i)][I_{BB}(\lambda_i, T_j)] = [P(T_j)]$$

for $\varepsilon(\lambda_i)$ where:
$P(T_j)$ is the power curve for temperatures $(T_j)$; and
$I_{BB}(\lambda_i, T_j)$ is radiation spontaneously emitted by a black body at the temperature of the emission source as a function of wavelength $\lambda_i$ following Planck's law.

It is thus a feature of at least one embodiment of the invention to provide highly accurate spectral output from spectrally broad thermal emissions.

The spectrum may have a light wavelength range of at least 3 to 13 μm. Similarly, in some embodiments, the stage may provide controllable temperatures including a range of at least 300 to 400 Kelvin and the broadband light detectors may provide a sensitivity equal to or greater than 90% of a peak sensitivity spanning at least 6 μm to 10 μm It is thus a feature of at least one embodiment of the invention to provide a spectrometer well adapted for mid-infrared or near-infrared measurements.

The stage may provide a heater and a temperature sensor and the electronic computer may execute the stored program to vary a temperature of the stage through a range of temperatures by changing the power applied to the heater and making temperature measurements with the temperature sensor to provide the sensed temperature.

It is thus a feature of at least one embodiment of the invention to replace complex spectroscopy mechanisms with a simple well-defined and electrically controllable heater.

The spectrometer may further include an optical system focusing the thermal radiation from the emission source onto multiple broadband light detectors in an array the electronic computer may execute the program to characterize the emissivity of the sample object over multiple image points imaged by the multiple broadband light detectors.

It is thus a feature of at least one embodiment of the invention to provide a spectrometer that can be readily adapted to hyperspectral or other imaging applications. Eliminating the need for dispersive optics greatly simplifies the collection of an image.

The optical spectrometer may further include a second stage adapted to hold the sample object between the emission source and the broadband light detector to provide at least one of reflection or transmission of the thermal radiation from the emission source by the sample object to the at least one broadband light detector.

It is thus a feature of at least one embodiment of the invention to permit measurements of objects or materials whose spectral characteristics of reflectance, transmittance, and/or emissivity are different for different temperatures. By using a separately heated object from the object being analyzed, such temperature-sensitive objects can be accommodated.

The spectrometer may further include a first and second polarizer positioned between the emission source and the object to be analyzed and between the object to be analyzed and the broadband light detector, respectively.

It is thus a feature of at least one embodiment of the invention to permit use of the inventive technique for polarization-resolved spectroscopy or spectroscopic ellipsometry, including single-angle measurements and variable-angle measurements.

In one embodiment, the electronic computer may execute the stored program to operate: (a) in a first mode to determine the emissivity of the sample object; and (b) in a second mode to determine a temperature of the sample object.

It is thus a feature of at least one embodiment of the invention to permit improved temperature measurements by accurately characterizing the emissivity of the object being sensed. It is another feature of at least one embodiment of the invention to leverage the same optics and equipment to both characterize emissivities and temperatures.

These particular objects and advantages may apply to only some embodiments falling within the claims and thus do not define the scope of the invention.

BRIEF DESCRIPTION OF THE DRAWINGS

FIG. 3 is a block diagram of the steps of a program executed by the computer of FIG. 1 to provide spectral measurements; and FIG. 4 is a block diagram similar to FIG. 1 of a second embodiment of the invention placing an analyzed object between the emission source and broadband detectors.

DETAILED DESCRIPTION OF THE PREFERRED EMBODIMENT

Figure 1:
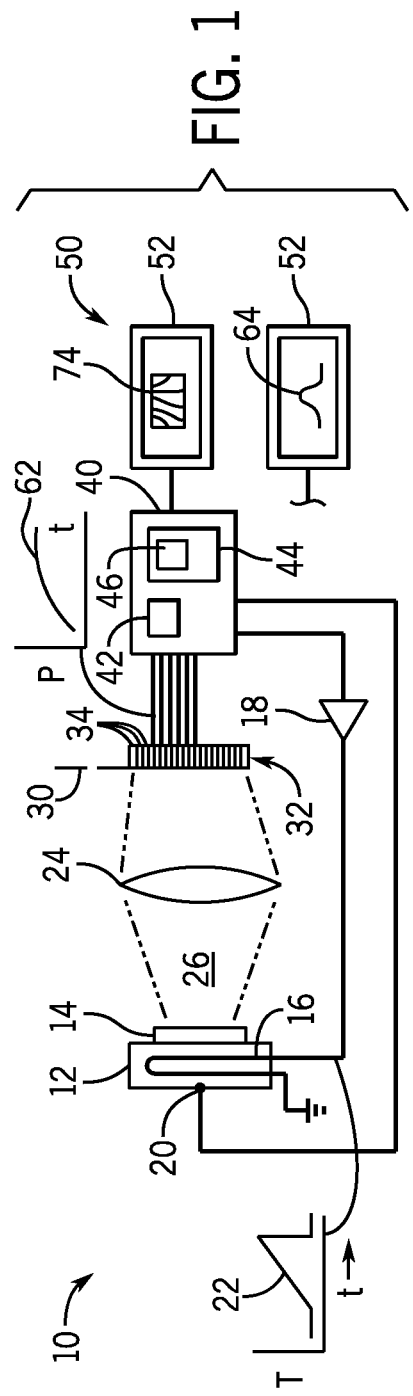
FIG. 1 is a block diagram of a first embodiment of the present invention employing a computer-controlled heated stage holding an object or material which thermally emits light toward one or more broadband detectors to provide a spectrum or spectral image of the object or material.

Referring now to FIG. 1, a spectrometer 10 of the present invention may provide a stage 12 supporting, and in thermal contact with, an emission source 14 whose spectral properties may be characterized. In one embodiment, the stage 12 may include an internal heater 16, for example, a resistive heating element, electrically communicating with a computer-controlled current source 18 such as an amplifier or controllable power supply. A temperature sensor 20 is in thermal communication with the emission source 14 via the stage12 to monitor a temperature 22 of the emission source 14 during operation.

An optical assembly 24 collects light 26 from thermal radiation generated by the emission source 14 to focus the same at a focal plane 30 on an array 32 of broadband detector elements 34. In one embodiment, the optical assembly 24 desirably functions in a mid-infrared range being generally understood to be 2-20 µm and may consist of one or more lenses, mirrors, zone plates and the like to provide the necessary focusing.

The array 32 of broadband detector elements 34 desirably is a two-dimensional array suitable for imaging where each detector element 34 makes a power measurement that can produce a pixel in an image, for example, of the surface of the emission source 14. Each of the detector elements 34 may be identical providing an operating sensitivity to light having a wavelength anywhere between 3 and 13 µm and are not relied upon, alone, for frequency discrimination. Desirably the detector elements 34 have a sensitivity that is at least 90% of a peak sensitivity spanning at least 6 µm to 10 µm. Example such detector arrays 32 suitable for use with the present invention are commercially available from FLIR Systems Inc. having offices in Wilsonville Oregon under the trade name of Neutrino LC providing a resolution of 640× 512 pixels in the midrange infrared region.

Power signals indicating the power received by each detector element 34 may be transmitted to a computer 40, for example, to be converted to digital values by internal analog to digital converters or the like. Similarly, the computer 40 may receive a temperature signal from the temperature sensor 20.

The computer 40 may further provide an output signal to the computer-controlled current source 18 to control the power output to the heater 16 and hence the temperature of the stage 12 according to the temperature signal from the temperature sensor 20 thus effecting a feedback or closed-loop temperature control for high accuracy.

The computer 40 may generally include one or more processors 42 communicating with an electronic memory 44 holding a stored program 46 as will be described below. Generally, the computer may communicate with a user interface 50 consisting of a keyboard or other entry device (not shown) and a graphics display 52 to provide output data as will also be discussed below.

Before use, the spectrometer 10, as described above, may be calibrated through the use of an emission source 14 with known emissivity, for example, a laboratory black body reference having a known emissivity of about 0.97. Subsequent energy measurements of light received by the detector elements 34 will be referenced against such a blackbody object to determine a deviation which indicates the character of the received light.

Figure 2:
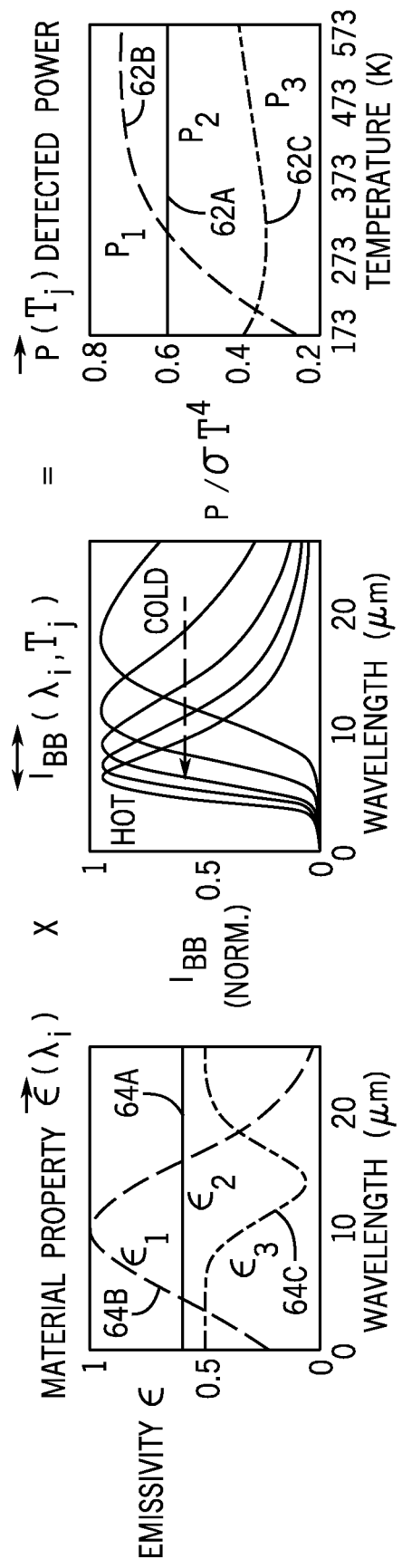
FIG. 2 is a diagram depicting emissivity curves for different representative objects, Planck distributions of thermal radiation at different temperatures and power curves being the product of the emissivity curves, and the Planck distributions that can be used to derive the emissivity curves.

Referring now also to FIGS. 2 and 3, during operation, the computer 40 may execute the program 46 as indicated by process block 60 to control the temperature stage 12 to sweep the temperature 22 through a predetermined temperature range, for example, from 200 to 500 Kelvin. During this time, the computer 40 may take multiple samples each indicating power of received light 26 by one detector element 34 recorded together with the temperature of the stage 12 at that time as indicated by process block 63. The result is a power curve 62 providing different power values at different times and corresponding stage temperatures. Generally, the power curve 62 will be obtained after a calibration process in which the object of known emissivity (ideally an approximation of a black body having constant emissivity in a range of interest) is used to obtain a calibration power curve. This calibration power curve is used to scale the power curve 62, for example, by dividing the power curve 62 by the calibration power curve.

In this raw form, the power curves 62 provides some insight into the spectrum of the light 26, generally showing, for example, a power curve 62a as a function of time and temperature consistent with corresponding a black body type emissivity curve 64a also showing constant emissions with frequency and temperature. The emissivity curve 64 generally indicates the emissivity of the emission source 14 as a function of wavelength.

Likewise, a power curve 62c that dips at midrange temperatures roughly matches a similar emissivity curve 64c, and an initially rising power curve 62b reflects an emissivity curve 64b which has an initially rising section. Note that the power curves 62 as depicted in FIG. 2 have been scaled by $\sigma T^4$ reflecting a general power increase at higher temperatures according to the Stefan-Boltzmann law. The information of the power curve 62 can be used for simple classification of the emissivities of the objects or materials being analyzed or may be provided, for example, to a more sophisticated machine learning classifier. Alternatively, more accurate spectrum information can be extracted as will now be described.

Referring still to FIG. 2, the emissivity curve 64 indicating the emissivity ($\varepsilon$) of the object of the emission source 14 exhibits a characteristic curve as a function of wavelength $\lambda$ of light denoted by $\varepsilon(\lambda)$. This function $\varepsilon(\lambda)$ reveals fundamental and inherent properties of the emission source 14 which can be deduced from the measurements of the spectrometer 10. In this regard, power curves 62 collected from the light 26 received from the emission source 14 by the detector elements 34, as the stage 12 is heated, are described generally by a product between the values of the emissivity of the emission source 14, $\varepsilon(\lambda_i)$, and the values of the thermally induced emissions $I_{BB}(\lambda_i, T_j)$ for a given temperature $T_j$ of the emission source 14 integrated over wavelengths $\lambda_i$.

These thermally induced emissions $I_{BB}(\lambda_i, T_j)$ describe a family of Planck distributions 66 shown in FIG. 2 and normalized to a black body radiator for clarity. Each Planck distribution 66 of $I_{BB}(\lambda_i, T_j)$ in turn describes radiation spontaneously emitted by a blackbody as a function of its temperature and having a continuous Planck spectrum described by Planck's law as follows:

$$I_{BB}(\lambda, T) = \frac{2hc^2}{\lambda^5} \frac{1}{e^{\frac{hc}{\lambda k_B T}} - 1} \quad (1)$$

where:
$k_B$ is the Boltzmann constant
h is Planck's constant; and
c is the speed of light.

Generally, a single such Planck distribution 66 will slide toward shorter wavelengths as the temperature of the emission source 14 rises to include proportionally more higher photons and fewer lower frequency photons according to the temperature as dictated by the Bose-Einstein distribution.

The measured energy received at the detector elements 34 over a range of different temperatures $T_j$ of the emission source 14 (and hence a power curve 62) will be described by a matrix product:

$$[\varepsilon(\lambda_i)][I_{BB}(\lambda_i, T_j)] = [P(T_j)] \quad (2)$$

where $P(T_j)$ is the power curve 62 measured by the present spectrometer during a heating cycle. Intuitively, the Planck distributions 66 can be envisioned as implementing a tunable filter (controlled by temperature) that sweeps across the frequency sensitive emissivity curves 64 to allow them to be resolved by a broadband detector element 34 where frequency of the received light 26 is encoded into a time dimension along the horizontal axis of the power curve 62.

It will be recognized from equation (2) that the power curves 62 can be used to determine the emissivity curves 64 by solving the matrix equation (2), for example, as a constrained least-squares problem. This processing, indicated by process block 72 of FIG. 3, may make use of standard mathematical techniques for matrix inversion well known in the art. Noise in this processing is reduced by placing boundaries on the input values reflecting known physical limitations of the temperature range and emissivity and through a postprocessing smoothing or filtering techniques reflecting ex ante knowledge that the emissivity curves 64 are generally smooth and continuous functions. Alternatively, reconstruction algorithms such as adaptive regularization and principal component regression may be used, as described respectively in Z. Yang, et al., Single-nanowire spectrometers. Science 365, 1017-1020 (2019) and E. Vigneau et al., Principal component regression, ridge regression and ridge principal component regression in spectroscopy calibration, J. Chemom. 11, 239-249 (1997) both hereby incorporated by reference.

Referring again to FIGS. 1 and 3, as indicated by process block 76, when the emission source 14 may be treated as essentially uniform in emissivity, a single emissivity curve 64 for the particular emission source 14 may be plotted by combining (for example by averaging) the power curves 62 of each of the detector elements 34 or by providing or using a single detector element 34. Alternatively, a spectral peak (for example, being a dominant or peak value of the emissivity curve 64) may be determined for each detector element 34 and displayed as a spectral image 74, for example, by assigning a pixel color to the frequency of that peak as is generally in the art. These images may be accompanied by quantitative information through appropriate calibration of the detector elements 34 and temperature sensor 20.

Referring now to FIG. 3, once the emissivity of emission source 14 is determined, this emissivity information may be used to further characterize the temperature of the emission source 14, for example, as may be caused by a localized heating of the emission source 14 independent of the stage 12 and in some cases as isolated from the stage 12. This calculation determines an energy value of light received from the emission source 14 having different temperatures along its surface (as opposed to the above-described heating of the emission source 14 by the stage which is essentially uniform and in thermal equilibrium). This determined energy value, for each detector element 34, indicated by process block 80, can then be used to determine the temperature of different portions of the emission source 14 (corresponding to light received by different detector elements 34) per process block 82 described by the following equation:

$$P(T) = \int_{\lambda_1}^{\lambda_2} \eta(\lambda) \in (\lambda) I_{BB}(\lambda, T) d\lambda \quad (3)$$

where $\eta(\lambda)$ is the response curve of the detector elements 34 measuring its sensitivity as a function of wavelength; and $\varepsilon$ is the emissivity of the emission source determined as discussed above.

The right-hand side of this equation represents known quantities and thus P(T) may be readily solved for T.

This approach may be useful when precise temperature measurements are desired of an object having varying emissivities over its surface that are unknown before characterization by the present invention.

The above determination of spectral content of the light 26, such as can reveal the wavelength dependent emissivity of the emission source 14, requires generally that the emissivity function of the emission source 14 is substantially constant as a function of temperature over the range of the measurement. This is true for many useful objects or materials, however the determination of emissivity of objects or materials that are not stable with temperature can also be provided by a modification of the embodiment of FIG. 1 as shown in FIG. 4.

In this embodiment, the emitted light 26 from a known emission source 14 may be directed against a second analysis object or material 84 which will be analyzed. This analysis object or material 84 may be optionally held on a second temperature-controlled stage 88 to account for its variable emissivity as a function of temperature. The second temperature-controlled stage 88 may also include a heater 90 and temperature sensor 92 operating analogously to heater 16 and temperature sensor 20 of stage 12 driven by computer-controlled amplifier 91.

Light 94 reflected from the analysis object 84 or transmitted through the analysis object 84 (for example by positioning the object to transmit rather than reflect light passing between the emission source 14 and the detector elements 34) may then be received through a second optical assembly 96 to be focused on the array 32. In this case the first optical assembly 24 provides a collimation or focusing of light from the emission source 14 to the analysis object 84 and the second optical assembly 96 provides a focusing of light from the analysis object 84 to the focal plane 36 of the detector array 32.

Again, as depicted in FIG. 3, the temperature of the stage 12 may be swept as indicated by process block 80 (with stage 88 being held at a constant temperature) and power curves 62 collected per process block 82.

The light received at the detector elements 34 will be described by the following equation (4) and will be a function of the thermal emission of the emission source 14 and the emissivities of the emission source 14 and the analysis object 84:

$$[\varepsilon_1(\lambda_i)][R_2(\lambda_i)][I_{BB}(\lambda_i, T_j)] = [P(T_j)] \quad (4)$$

where:

$\varepsilon_1(\lambda_i)$ is the known emissivity of the emission source 14; and $R_2(\lambda_i)$ is the unknown reflectance or transmittance of the analysis object 84 solved through matrix inversion or other similar technique.

At process block 82, the reflectance of analysis object 84 may be calculated again by solving equation (4) for $R_2(\lambda_i)$, for example, by performing a matrix inversion or other solution technique. If the analysis object 84 is being used in an absorbing rather than reflecting orientation, transmittance may be equally deduced from $T_2(\lambda_i)$ and displayed as a spectrum or transmittance curve with an inverted scale or as a spectral image 74 with pixels denoting frequencies of minimums rather than peaks of power.

Referring again to FIG. 4, the optical assemblies 24 and 96 may include polarizing 100a and 100 positioned between emission source 14 and analysis object 84 and between analysis object 84 and detector array 32 respectively to permit techniques of ellipsometry be performed such as may, for example, be used to measure the complex refractive index and thickness of the analysis object 84.

It will be appreciated that wavelength and frequency may be used interchangeably as measurements of light frequency and that references to energy and energy measurement may be expressed or implemented as measurements of power (energy per unit time) or intensity (power per area). The term "blackbody radiation" as used herein refers to thermal emissions following Planck's law.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An optical spectrometer comprising:
    a temperature adjustable stage adapted to control the temperature of an emission source, the emission source providing thermal radiation in response to multiple temperatures of the temperature adjustable stage;
    at least one broadband light detector receiving the thermal radiation from the emission source as so positioned to provide thermal-radiation power measurements;
    an electronic computer executing a program stored in non-transitory media to:
    (a) sample the thermal-radiation power measurements and temperatures of the temperature adjustable stage at a set of sampling times and different emission source temperatures to provide a power curve as a function of temperature; and
    (b) process the power curve to characterize an emissivity of a sample object over a range of wavelengths.

2. The optical spectrometer of claim 1 wherein the processing of the power curve scales the power curve according to a reference power curve of an object of known emissivity.

3. The optical spectrometer of claim 2 wherein the object of known emissivity has a substantially constant emissivity in a predetermined frequency range of interest.

4. The optical spectrometer of claim 2 wherein the sample object is the emission source and the processing of the power curve further provides a spectrum of the emissivity of the emission source.

5. The optical spectrometer of claim 4 wherein the processing of the power curve provides an output satisfying a solution to an equation of:

$$[\varepsilon(\lambda_i)][I_{BB}(\lambda_i,T_j)]=[P(T_j)]$$

for $\varepsilon(\lambda_i)$ where:
$P(T_j)$ is the power curve for temperatures $(T_j)$; and
$I_{BB}(\lambda_i, T_j)$ is the intensity of radiation thermally emitted by a blackbody as a function of wavelength $\lambda_i$ following Planck's law.

6. The optical spectrometer of claim 4 wherein the spectrum includes wavelength in a range of 3 to 13 μm.

7. The optical spectrometer of claim 1 wherein the at least one broadband light detector provides a sensitivity that is at least 90% of a peak sensitivity spanning at least 7 μm to 14 μm.

8. The optical spectrometer of claim 1 wherein the stage provides controllable temperatures in a temperature range of at least 300 to 400 Kelvin and where in the electronic computer executes the program to obtain at least ten different thermal radiation energy samples within the temperature range.

9. The optical spectrometer of claim 1 wherein the stage provides a heater and a temperature sensor and the electronic computer executes the program to vary a temperature of the stage through a range of temperatures by changing the power applied to the heater and making temperature measurements with the temperature sensor to provide the sensed temperature.

10. The optical spectrometer of claim 1 further including an optical system focusing the thermal radiation from the emission source onto multiple broadband light detectors in an array and wherein the electronic computer executes the program to characterize the emissivity of the sample object over multiple image points imaged by the multiple broadband light detectors.

11. The optical spectrometer of claim 10 further including an output display communicating with the electronic computer and wherein the electronic computer executes the program to output an image based on the emissivities of the sample object.

12. The optical spectrometer of claim 1 further including a second stage adapted to hold the sample object between the emission source and the broadband light detector to provide at least one of reflection or transmission of the thermal radiation from the emission source by the sample object to the at least one broadband light detector.

13. The optical spectrometer of claim 12 wherein the first reference power curve is a power curve of an object of the emission source.

14. The optical spectrometer of claim 13 wherein the processing of the power curve provides an output satisfying a solution to the equation of:

$$[\varepsilon_1(\lambda_i)][R_2(\lambda_i)][I_{BB}(\lambda_i,T_j)]=[P(T_j)]$$

for $R_2(\lambda_2)$
where:
$\varepsilon_1(\lambda_i)$ is the emissivity of the emission source;
$R_2(\lambda_2)$ is the unknown reflectance or transmittance of the sample object;
$P(T_j)$ is the power curve for temperatures $(T_j)$; and
$I_{BB}(\lambda_i, T_j)$ is radiation spontaneously emitted by a blackbody at the temperature of the emission source as a function of wavelength $\lambda_i$ following Planck's law.

15. The optical spectrometer of claim 12 further including at least one polarizer positioned between the emission source and the object to be analyzed and/or between the object to be analyzed and the broadband light detector, respectively.

16. The optical spectrometer of claim 1 wherein the electronic computer executes the program to operate
    (a) in a first mode to determine the emissivity of the sample object; and
    (b) in a second mode to determine a temperature of the sample object.

* * * * *